US009996851B1

(12) United States Patent
Hummel et al.

(10) Patent No.: US 9,996,851 B1
(45) Date of Patent: Jun. 12, 2018

(54) PERFORMANCE BASED CONTENT ITEM RANKING

(71) Applicant: Google Inc., Mountain View, CA (US)

(72) Inventors: Patrick Hummel, Cupertino, CA (US); Randolph P. McAfee, San Marino, CA (US)

(73) Assignee: Google LLC, Mountain View, CA (US)

(*) Notice: Subject to any disclaimer, the term of this patent is extended or adjusted under 35 U.S.C. 154(b) by 921 days.

(21) Appl. No.: 14/171,150

(22) Filed: Feb. 3, 2014

(51) Int. Cl.
*G06Q 30/00* (2012.01)
*G06Q 30/02* (2012.01)

(52) U.S. Cl.
CPC .................. *G06Q 30/0242* (2013.01)

(58) Field of Classification Search
CPC .............. G06Q 30/02; G06Q 30/0256; G06Q 30/0273; G06Q 30/0275; G06Q 30/08; G06Q 30/0247; G06Q 30/0277; G06Q 40/04; G06Q 40/08; G06Q 30/0242; G06Q 30/0251; G06Q 10/06393; G06Q 40/02; G06Q 10/10; G06Q 30/0241; G06Q 30/0244; G06Q 30/0276
USPC ...................................... 705/14.45
See application file for complete search history.

(56) References Cited

U.S. PATENT DOCUMENTS

| | | | | |
|---|---|---|---|---|
| 6,473,084 | B1 * | 10/2002 | Phillips | G06Q 40/04 345/440 |
| 7,236,952 | B1 * | 6/2007 | D'Zmura | G06Q 40/04 705/36 R |
| 8,676,650 | B1 | 3/2014 | Jurca | |
| 9,354,700 | B1 | 5/2016 | Rohrl et al. | |
| 9,367,583 | B1 | 6/2016 | Bernard et al. | |
| 9,521,189 | B2 | 12/2016 | Xu | |
| 2009/0265227 | A1 * | 10/2009 | Langford | G06Q 30/02 705/14.45 |
| 2009/0324083 | A1 * | 12/2009 | Campbell | G06K 9/3208 382/190 |

(Continued)

FOREIGN PATENT DOCUMENTS

JP 2001195409 A * 7/2001 ............. G06F 17/30

OTHER PUBLICATIONS

Goggle. Understanding and Using Page Value (Jul. 24, 2012). Retrieved online Jan. 20, 2017. https://analytics.googleblog.com/2012/07/understanding-and-using-page-value.html.*

(Continued)

*Primary Examiner* — James A Reagan
(74) *Attorney, Agent, or Firm* — Foley and Lardner LLP

(57) ABSTRACT

Methods, systems, and apparatus, including computer programs encoded on a computer storage medium, for distributing content items are disclosed. In one aspect, a method includes accessing a scaling factor value and accessing a first page value range specifying at least a high page value and a low page value. A determination is made that a first ranking of content items based on the high page value does not match a second ranking of the content items that is based on the low page value. In response to determining that the first ranking does not match the second ranking, an updated first ranking and an updated second ranking are determined based on a second page value range. A determination is made that the updated first ranking matches the updated second ranking. Content items are distributed based on the updated first ranking.

20 Claims, 5 Drawing Sheets

(56) References Cited

U.S. PATENT DOCUMENTS

| | | | |
|---|---|---|---|
| 2011/0218865 A1* | 9/2011 | Muthukrishnan | G06Q 30/0275 705/14.71 |
| 2013/0024471 A1 | 1/2013 | Mitrovic | |
| 2013/0325585 A1* | 12/2013 | Amit | G06Q 30/0241 705/14.41 |
| 2014/0365320 A1* | 12/2014 | Kanter | G06Q 30/0277 705/14.73 |
| 2014/0372230 A1 | 12/2014 | Ray et al. | |
| 2015/0046467 A1 | 2/2015 | Hummel et al. | |

OTHER PUBLICATIONS

Aggarwal, et al. 2008. "Sponsored Search auctions with Markovian users." Proceedings of the Fourth International Workshop on Internet and Network Economics (WINE). 4: pp. 621-628.
Athey, et al. "Position Auctions with Consumer Search." Quarterly Journal of Economics 126(3):pp. 1213-1270. 2011.
Fotakis, et al. "Externalities Among Advertisers in Sponsored Search." Proceedings of the Fourth International Symposium on Algorithmic Game Theory (SAGT). 4: pp. 105-116. 2011.
Giotis, et al. "On the Equilibria and Efficiency of the GSP mechanism in Keyword Auctions with Externalities." Proceedings of the Fourth International Workshop on Internet and Network Economics (WINE). 4: pp. 629-638.
Gomes, Renato et al. "Externalities in Keyword Auctions: an empirical and Theoretical assessment." Proceedings of the Fifth International Workshop on Internet and Network Economics (WINE). vol. 5. pp. 172-183. 2009.
GOSH_2008. "Externalities in online Advertising." Proceedings of the Seventeenth International Conference on the World Wide Web (WWW) 17 pp. 161-168.
Hummel, etal. "Position auctions with Externalities and Brand Effects." Google Inc. Typescript. 2014.
Ieong, et al. 2014. "Advertising in a Stream." Proceedings of the Twenty-Third International Conference on the World Wide Web (WWW) 23 pp. 29-38.
Jehiel, et al. "Efficient Design with Interdependent Evaluation". Econometrica. 69(5): pp. 1237-1259. 2001.
Jehiel, et al. "How(Not) to Sell Nuclear Weapons." American Economic Review. 86(4): pp. 814-829. 1996.
Jehiel, et al. "Multidimensional Mechanism Design for Auctions with Externalities". Journal of Economic Theory. 85(2): pp. 258-293. 1999.
Jehiel, et al. 1996. "Strategic nonparticipation". RAND Journal of Economics. 27(1): 84-98.
Jerath, et al. 2011. "A "Position Paradox" in Sponsored Search Auctions." Marketing Science 30(4)pp. 612-627.
Jeziorski, et al. 2014. "What makes them click:empirical analysis of consumer demand for search advertising." University of California, Berkeley Typescript.
Katz, et al. "On the Licensing of Innovations." RAND Journal of Economics 16(4): pp. 504-520. 1985.
Kempe, et al. "A Cascade Model for Externalities in Sponsored Search." Proceedings of the Fourth International Workshop on Internet and Network Economics (WINE) vol. 4: pp. 585-596. 2008.
Roughgarden. "Do externalities degrade GSP's Efficiency?" Stanford University Typescript. 2012.
Edelman et al., Internet Advertising and the Generalized Second Price Auction: Selling Billions of Dollars of Keywords, American Economic Review 97(1):242-259, 2007, 22 pages.
Gonen et al., 'Sponsored Search Auctions with Reserve Prices: Going Beyond Separability,' Proceedings of the 4th International Workshop on Internet and Network Economics (WINE) 4:597-608, 2008, 12 pages.
Hummel et al., "Position Auctions with Externalities—IDF Attachment," Dec. 12, 2013, 4 pages.
Varian, 'Position Auctions,' International Journal of Industrial Organization 25(6):1163-1178, 2007, 16 pages.
U.S. Office Action on U.S. Appl. No. 14/546,786 dated Apr. 13, 2017.

* cited by examiner

PERFORMANCE BASED CONTENT ITEM RANKING

BACKGROUND

This specification relates to data processing and content distribution.

The Internet facilitates the exchange of information and transactions between users across the globe. This exchange of information enables content sponsors to provide sponsored content to a variety of users. A content sponsor can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item provided by a content sponsor is deemed eligible to be provided for presentation.

SUMMARY

In general, one innovative aspect of the subject matter described in this specification can be embodied in methods that include the actions of accessing a scaling factor value associated with a negative effect that presentation of one or more content items has on performance of one or more other content items presented with the one or more content items; accessing a first page value range specifying at least a high page value and a low page value; determining that a first ranking of eligible content items that is based on the high page value and the scaling factor value does not match a second ranking of the eligible content items that is based on the low page value and the scaling factor value; and in response to determining that the first ranking does not match the second ranking, determining an updated first ranking or an updated second ranking based on a second page value range that differs from the first page value range; determining, that the updated first ranking matches the updated second ranking; and in response to determining that the updated first ranking matches the updated second ranking, distributing content items based on the updated first ranking. Other embodiments of this aspect include corresponding systems, apparatus, and computer programs, configured to perform the actions of the methods, encoded on computer storage devices.

These and other embodiments can each optionally include one or more of the following features. Methods can include the actions of selecting a range of scaling factor values; accessing historical content item performance data specifying impressions of content items and one or more actual user interactions with the content items that correspond to the impressions; and selecting a particular scaling factor value based, at least in part, based on the historical content item performance data.

Selecting a particular scaling factor value can include for each of two or more particular scaling factor values in the range of scaling factor values: determining, based on the particular scaling factor value and the historical content item performance, a predicted click-through-rate for each of the impressions; determining a log loss that would have resulted from using the predicted click-through-rate to distribute content items corresponding to the impressions; determining a number of expected user interactions with content items that would have occurred in response to using the particular scaling factor value; determining, based at least in part on the number of expected user interactions and a number of the actual user interactions, an increase in log loss that is attributable to using the particular scaling factor value for content item distribution; and determining, based on a difference between the log loss and the increase in log loss, an adjusted log loss for the particular scaling factor value; and selecting the particular scaling factor value having less than a specified adjusted log loss.

Selecting the particular scaling factor value having less than a specified adjusted log loss can include selecting the particular scaling factor value having a lowest adjusted log loss.

Methods can further include the actions of determining the high page value based, at least in part, on bids associated with the content items, historical performance measures corresponding to the content items, and position factors for presentation positions corresponding to the content items; and determining the low page value based, at least in part, on the bids associated with the content items, historical performance measures of the content items, and the scaling factor value.

Determining the predicted high page value can include ranking each of at least some of the content items based on a product of the bid associated with the content item and a quality value corresponding to a historical performance measure for the content item; identifying, based on the ranking, a highest ranking set of the content items; determining, for each content item in the highest ranking set, an expected value of the content item based on a product of the bid associated with the content item, the quality value for the content item, and a position factor for a presentation position corresponding to the content item; and summing the first expected values for the content items in the highest ranking set to obtain the predicted high page value.

Methods can include the actions of determining a discount value based, at least in part, on the scaling factor value, the quality values for the content items in the highest ranking set, and position factors for presentation positions corresponding to the highest ranking set, wherein determining the predicted low page value comprises determining the low page value based, at least in part, on a ratio of the high page value relative to the discount value.

Particular embodiments of the subject matter described in this specification can be implemented so as to realize one or more of the following advantages. The revenue generated by a particular set of content items can be increased by arranging the content items in a manner that decreases the negative effect of each content item on the performance of other content items in the particular set. The arrangement (e.g., ranking) of the content items can be selected in a computationally efficient manner by iteratively ranking the content items using a high page value and low page value, determining whether the rankings in each iteration match, and updating one of the high page value or low page value until the rankings match in an iteration. The computation efficiency enables the arrangement (e.g., ranking) to be performed at the time a request is received (e.g., within a response time constraint specifying a maximum amount of time that is allowed for responding to the request).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes content allocation techniques that select a presentation order (e.g., ranking) for a set of content items (e.g., advertisements) for presentation in multiple presentation positions. As described in detail below, the presentation order of the set of content items is selected based, in part, on the effect that presentation of each content item in the set has on the expected performance of other content items in the set.

The expected performance of a content item can be based, at least in part, on a likelihood that a user will interact with (e.g., click) the content item when presented. The likelihood that a particular content item will be clicked is generally highest when that particular content item is the only content item presented. As additional content items are presented with the particular content item, the likelihood that the particular content item will be clicked is generally reduced, for example, because a user viewing the page has the option to select one of the other content items instead of the particular content item.

The amount by which the likelihood that the particular content item will be clicked is reduced can depend, for example, on a number of other content items that are presented with the particular content item, measures of quality associated with the other content items (e.g., estimated click-through-rates), and/or historical performance measures associated with presentation positions at which the other content items are presented. Selecting content item allocations (e.g., presentation positions in which the content items will be presented) based, at least in part, on these factors can result in a higher performing allocation (e.g., a higher click through rate, higher revenue, or higher conversion rate) than that achieved when these factors are not considered.

The discussion that follows refers to advertisements as example content items that can be distributed using the described techniques. The discussion is also applicable to other types of content items (e.g., videos files, audio files, or other types of content).

Figure 1:
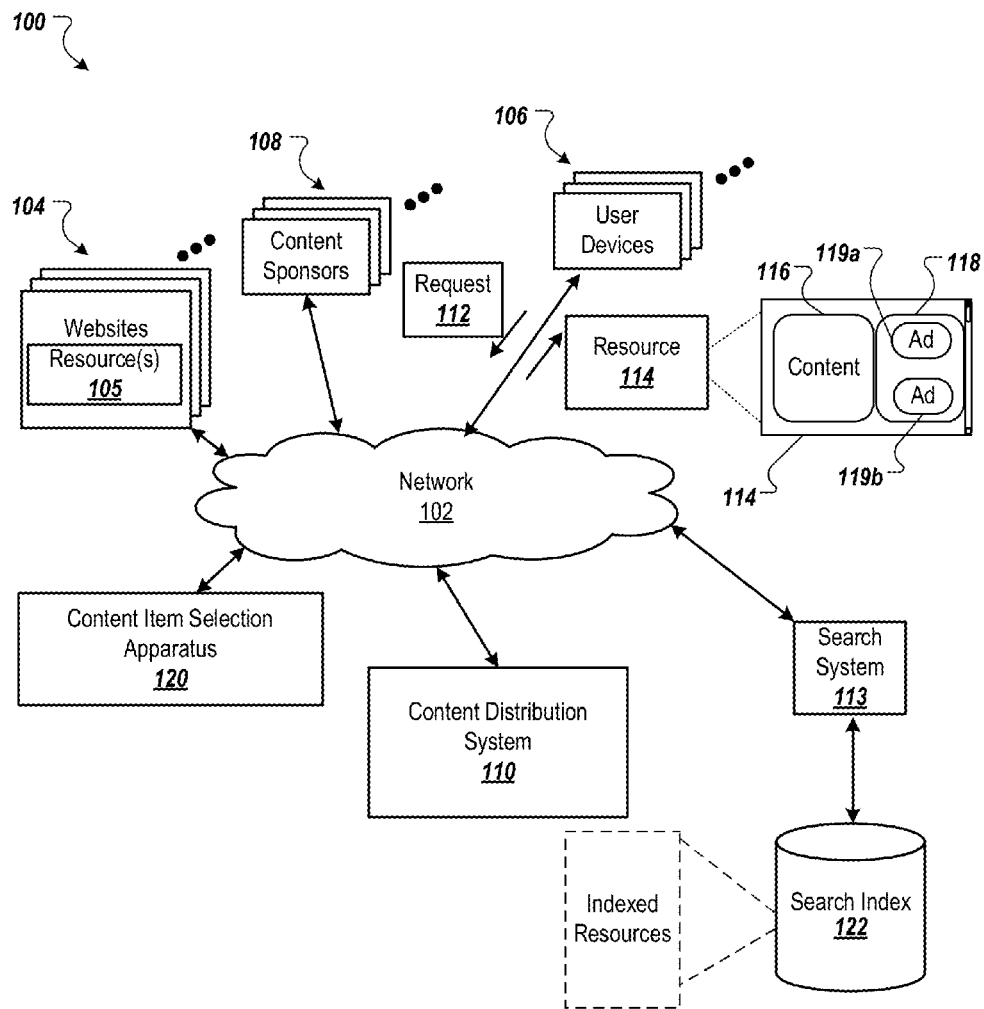
FIG. 1 is a block diagram of an example environment in which content is distributed to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a web page from a social network, or another resource 105. The data representing the requested resource 114 can include data that cause presentation of resource content 116 at the user device 106. The data representing the requested resource 114 can also include data specifying a content item slot 118. A content item slot is a portion of the resource (e.g., a portion of a web page) or a portion of a user display (e.g., a presentation location of another window or in a slot of a web page) in which one or more content items, such as advertisements, can be presented. A content item slot 118 can also be referred to as an advertisement slot, but any type of content (e.g., content items other than advertisements) can be presented in the content item slot 118.

A single content item slot 118 may be configured to include one or more presentation positions 119a and 119b. Alternatively or additionally, each different content item slot 118 can be considered a separate presentation position. Each presentation position can represent a portion of the content item slot 118 at which a content item can be presented. In some implementations, the number of presentation positions and/or the size of the presentation positions for a particular content item slot 118 may be determined based on the number, type, and/or value of content items that are available for presentation in the content item slot. For example, as described in detail below, a set of content items that are associated with respective highest values (e.g., among eligible content items) may be selected for presentation, and the number of presentation positions included in the content item slot 118 can be determined based on the number of content items that are included in the selected set of content items. A publisher can specify a maximum number of presentation positions that are to be included in a particular content item slot, and the selection of the set of content items can be constrained based on that maximum number.

To facilitate searching of resources, the environment 100 can include a search system 113 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 113 over the network 102. In response, the search system 113 accesses the search index 122 to identify resources that are relevant to the search query. The search system 113 identifies the resources in the form of search results and returns the search results to the user device in search results page. A search result is data generated by the search system 113 that identifies a resource that is responsive to a particular search query, and includes a link to the resource. An example search result can include a web page title, a snippet of text or a portion of an image extracted from the web page, and the URL of the web page. Like other resources, search results pages can include one or more content item slots 118 in which content items, such as advertisements, can be presented.

When a resource 105 is requested by a user device 106, execution of code associated with a content item slot 118 in the resource initiates a request for one or more content items to populate the slot. The request can include characteristics of the slots that are defined for the requested resource 114. For example, a reference (e.g., URL) to the requested resource 114 for which the content item slot 118 is defined, a size of the content item slot, a maximum number of presentation positions (or content items) that can be included in the content item slot 118, and/or media types that are eligible for presentation in the content item slot 118 can be provided to the content distribution system 110. Similarly, keywords associated with a requested resource ("resource keywords") or entities that are referenced by the resource can also be provided to the content distribution system 110 to facilitate identification of content items that are relevant to the requested resource 114. The requests can also include other information, such as information that the user has provided, geographic information indicating a state or region from which the request was submitted, or other information that provides context for the environment in which the content item will be displayed (e.g., a type of device at which the content item will be displayed, such as a mobile device or tablet device).

The content items that are provided in response to a request (or another content item request) are selected based, in part, on distribution parameters associated with the content items. Distribution parameters are a set of criteria upon which distribution of content items are conditioned. In some implementations, the distribution criteria for a particular content item can include distribution keywords that must be matched (e.g., by resource keywords or search queries) in order for the content item to be eligible for presentation. The distribution criteria can also specify a bid and/or budget for distributing the particular content item. As described in more detail below, bids can be used to select a set of content items for presentation with a resource and/or to determine in which presentation position the content item(s) will be presented.

In some implementations, the content distribution system 110, either alone or in combination with one or more data processing apparatus, determines a number of content items that will be provided in response to a particular content item request. For example, if the content distribution system 110 receives a request for one or more content items, the request may specify, or be associated with, a maximum number of content items that are able to be presented in a particular content item slot. In response to the content item request, the content distribution system 110 determines a number of content items, up to the maximum number, that will be provided in response to the request. For example, if the content item request specifies that up to five content items can be presented in a particular content item slot, the content distribution system can select between zero and five content items to be provided in response to the content item request.

In some implementations, the content items selected by the content distribution system 110 are sized for presentation based on the total number of content items that are being provided in response to the request 112. For example, assume that the dimensions of the content item slot 118 remain constant irrespective of the number of content items that are presented in the content item slot 118. In this example, the selected content items can be sized so that the total dimensions of the combined set of content items correspond to (e.g., equal or be some specified amount less than) the dimensions of the content items slot 118, and the size of each content item can correspond to, or determine, a size of a presentation position for the content item. Thus, when a single content item is presented, that content item can have dimensions equal to the dimensions of the content item slot 118. Similarly, when two content items are presented, each of the content items can be sized to occupy one-half of the content item slot 118, and the dimensions of the content items can continue to decrease as the number of content items presented in the content item slot 118 increases. Note that for purposes of example, the content items are each assumed to occupy an equal portion (when two or more are presented) of the content item slot 118, but the techniques described in this document can also be used when the various content items are of various sizes (e.g., where a highest ranked content item occupies more space than a lower ranked content item).

The performance of content items can vary based on the size of the content items and/or a number of content items that are presented. For example, if only a single content item is presented in a content item slot 118, that content item will be presented more prominently than if another content item were presented in the content item slot 118 with that content item. Similarly, when a single content item is selected, that content item will be the only content item in the slot with which a user can interact. As more content items are presented in the content item slot 118, the user has the option of selecting any of the content items presented in the content item slot 118. Therefore, the expected performance of a particular content item when presented with one or more other content items may be lower than the expected performance when the particular content item is the only content item presented in the content item slot 118.

The performance of a content item can also vary based, in part, on a presentation position of the content item within the content item slot 118. For example, assume that two content items are presented in two presentation positions 119a and 119b of the content item slot 118. In this example, users may more often interact with content items that are presented in a particular presentation position (e.g., a more prominent presentation position 119a), such that the performance of (e.g., a number of clicks received by) content items presented in the particular presentation position may generally be higher than the performance of content items presented in the other presentation position (e.g., 119b).

In a particular example, the presentation position 119a may have a higher historical performance (e.g., historical click through rate) than the presentation position 119b.

Therefore, the expected performance of a particular content item when selected for presentation in presentation position 119a may be higher than the expected performance of that same content item when selected for presentation in presentation position 119b. Differences in expected performance of a content item based on the presentation position in which the content item is presented and/or a number of other content items that are being presented with the content item can be quantified using position factors, which are discussed in more detail below.

The set of content items that are selected for presentation in a particular number of presentation positions can be selected, for example, based on an expected value corresponding to presentation of the content items in the set. For example, content items can be ranked based on their respective expected values and the top ranked content items can be selected for presentation in the particular number of presentation positions. The expected value of a content item can be determined, for example, based, at least in part, on a product of a bid associated with the content item and a quality value corresponding to a historical performance measure (e.g., click-through-rate) for the content item. Selecting the set of content items based only on the product of the bid associated with the content item and the quality value for the content item generally does not consider the negative effect that presentation of each content item in the set has on the performance of other content items in the set.

The environment 100 includes a content item selection apparatus 120 that selects a presentation order for a set of content items, based at least in part, on the negative effect that presentation of each content item in the set will have on the expected performance of other content items in the set. For example, as discussed in more detail below, the content item selection apparatus 120 can rank each particular content item based, at least in part, on a scaling factor value corresponding to the negative effect (e.g., on content item value) that presentation of other content items in the set will have on each particular content item. In turn, the content items can be provided for presentation based on the ranking.

Figure 2:
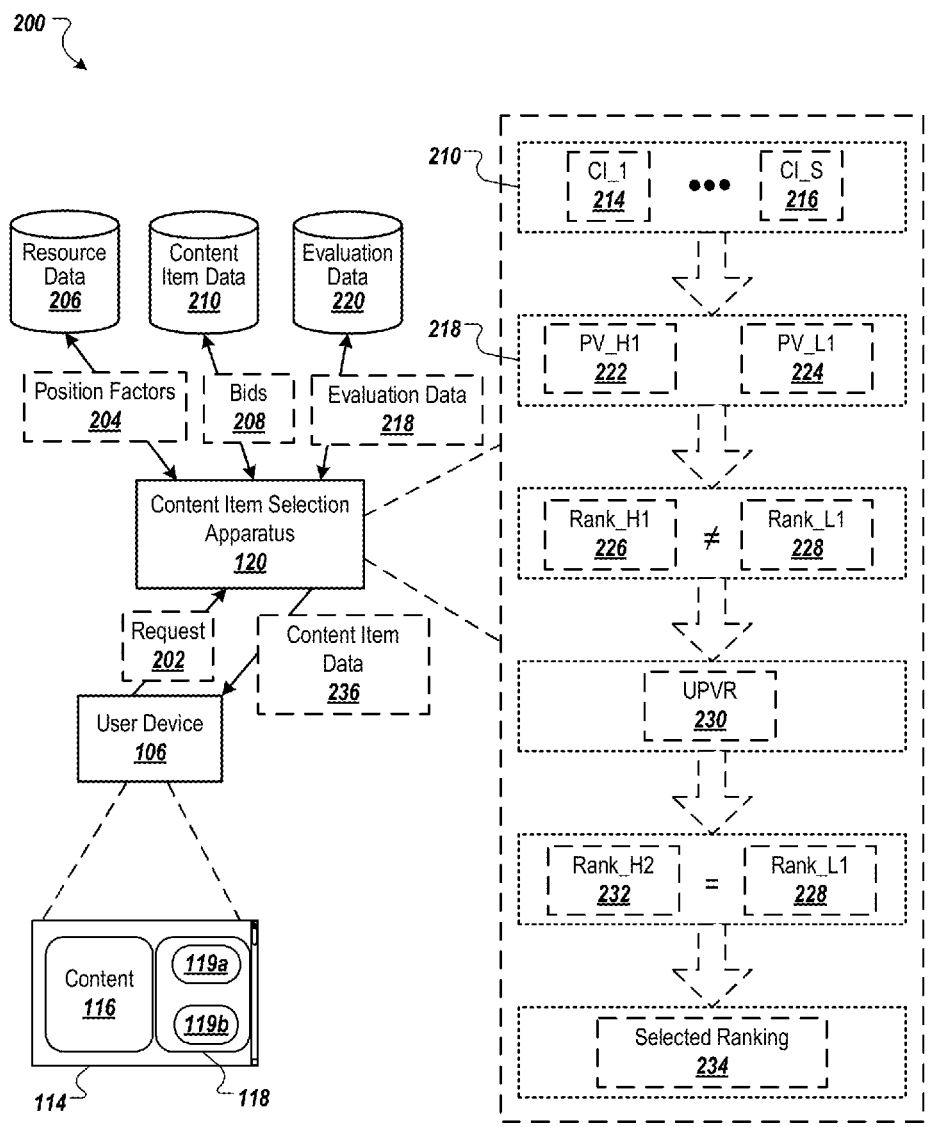
FIG. 2 is an example data flow illustrating an example process of distributing content items for presentation in multiple presentation positions.

FIG. 2 is an example data flow 200 illustrating an example process of distributing content items for presentation in multiple presentation positions. The data flow 200 begins with the Content Item Selection Apparatus ("CISA") 120 receiving a content item request 202. The content item request 202 is a request for a content item (e.g., advertisement) that will be presented with a resource (e.g., web page). As illustrated by FIG. 2, the content item request 202 ("request") can be submitted by a user device 106 when the resource 114 is rendered at the user device 106. For example, execution of code included in the resource 114 can cause the user device 106 to submit the content item request 202.

The CISA 120 can receive the content item request 202 directly from the user device 106 or from another device or system (e.g., the content distribution system 110). For example, if the CISA 120 is implemented independent of the content distribution system 110, the user device 106 may submit the content item request 202 to the content distribution system 110, which can provide the content item request 202 (or data associated with the content item request 202) to the CISA 120.

The content item request 202 can include data specifying a number of content items that can be presented with the resource 114. For example, as illustrated by FIG. 2, the resource 114 includes a content item slot 118 having two presentation positions 119a and 119b. In this example, the content item request 202 may specify that two content items can be presented with the resource 114 (e.g., in presentation positions 119a and 119b).

In response to receiving the content item request 202 (or data associated with the content item request 202), the CISA 120 obtains position factors 204 for the presentation positions 119a and 119b that are included in the resource 114. The position factors 204 can be obtained, for example, from a data store such as the resource data store 206, which stores data related to resources to which content items are provided.

The position factor for each presentation position is a value based, at least in part, on historical performance of content items that have been presented in the presentation position. For example, the position factor for presentation position 119a can be determined based on a click-through-rate (or another performance measure) of content items that have been presented in the presentation position 119a, and the position factor for presentation position 119b can be determined based on a click-through-rate of content items that have been presented in the presentation position 119b. The position factor for each presentation position is generally an indication of the likelihood that a user will interact with (e.g., click) a content item presented in that presentation position.

In response to receiving the content item request 202, the CISA 120 can also obtain bids 208 associated with content items that are eligible for presentation in the presentation positions 119a and 119b. The bids 208 can be received, for example, from a content item data store 210 that stores data for multiple different content items. The bids specify, for each content item, an amount that a content sponsor will pay for distribution of the content item.

The CISA 120 can rank the eligible content items based on the bids 208 to create a set of ranked (or initially ranked) content items 210 (e.g., CI_1, . . . , CI_S). In some implementations, each content item in the set of ranked content items 210 is ranked based on an estimated value of the content item. For example, the estimated value of each eligible content item can be determined using relationship (1).

$$v_i = b_i q_i \tag{1}$$

where, $v_i$ is the value of content item (i);

$b_i$ is the bid associated with content item (i); and $q_i$ is the quality value for content item (i).

The number of content items that are included in the set of ranked content items 210 can be based, for example, on the number of presentation positions that are available for presentation of content items. For example, if the request 202 specifies that there are five eligible presentation positions in the resource 114, then five content items can be included in the set of ranked content items. As illustrated by FIG. 2, the set of ranked content items includes CI_1 (214) to CI_S (216), where S corresponds to the number of available presentation positions.

In some implementations, the CISA 120 accesses evaluation data 218 including a scaling factor value that is associated with a negative effect that presentation of one or more content items in the set of ranked content items will have on the performance of one or more other content items in the set of ranked content items. The scaling factor value can be determined on a periodic basis and stored in an evaluation data store 220 for use by the CISA 120. For example, a different scaling factor value can be determined for each different resource 114 and each different configuration of presentation positions for the resource. Each scaling factor value can be indexed according to the resource for which the scaling factor value was determined and/or the presentation position configuration for which the scaling factor value was determined. For brevity and clarity, the discussion that follows will only consider a single resource and a single presentation position configuration. Determination of a scaling factor value is discussed below with reference to FIG. 3.

The CISA 120 determines a set of page values 214 that includes a high page value ("PV_H1") and a low page value ("PV_L1") based, in part, on the scaling factor value and the estimated values of the set of ranked content items 210. The range of values from the low page value to the high page value is referred to as a page value range.

The high page value is a value that exceeds an expected page value for the resource. The low page value is a value that is less than the expected page value for the resource. As used throughout this document, the "expected page value" is a value that is expected to be realized by presenting content items in the presentation positions of a resource. For example, the expected page value for the resource 114 is the value that is expected to be realized from presenting content items in the presentation positions 119a and 119b. Therefore, the high page value (PV_H1) 222 for the resource 114 can be a value that exceeds the expected page value for the resource 114, and the low page value (PV_L1) 224 for the resource 114 can be a value that is less than the expected page value for the resource 114.

In some implementations, the high page value 222 can initially be determined based on the estimated value of each content item in the set of ranked content items 210 and the position factors 204. For example, the high page value 222 can be determined based on relationship (2).

$$HV(x) = \Sigma_{m=1}^{s} pf_m b_m q_m \quad (2)$$

where,

HV(x) is the high page value for resource (x);

s is a total number of presentation positions in which content items are being presented;

$pf_m$ is the position factor for presentation position (m);

$b_m$ is the bid associated with the content item from the set of ranked content items 210 that will be presented in presentation position (m), e.g., the content item with the $m^{th}$ highest ranking; and $q_m$ is the quality value for the content item from the set of ranked content items 210 that will be presented in the presentation position (m).

In some implementations, the low page value 224 can be determined based on a ratio of the high page value (e.g., HV(x)) relative to a function of the scaling factor value. For example, the low page value 224 can be determined using relationship (3).

$$LV(x) = \frac{HV(x)}{1 + \lambda_x \sum_{m=1}^{s} pf_m q_m} \quad (3)$$

where,

LV(x) is the low page value for resource (x);

HV(x) is the high page value for resource (x);

s is a total number of presentation positions in which content items are being presented;

$pf_m$ is the position factor for presentation position (m);

$q_m$ is the quality value for the content item from the set of ranked content items 210 that will be presented in the presentation position (m)), e.g., the content item with the $m^{th}$ highest ranking; and $\lambda_m$ is the scaling factor value for the resource (x).

The CISA 120 uses the high page value 222 and the low page value 224 to re-rank the content items in the set of ranked content items 210. In some implementations, the CISA 120 creates one ranking based on the high page value and another ranking based on the low page value. For example, the CISA 120 can create the ranking "Rank_H" 226 based on the high page value 222 and can create the ranking "Rank_L" 228 based on the low page value 224. The ranking 226 can be created, for example, based on scores obtained using relationship (4).

$$Score_i = b_i q_i - \lambda_x q_i HV(x) \quad (4)$$

where, $Score_i$ is the rank score for content item (i) from the set of ranked content items 210;

$b_i$ is the bid associated with the content item (i);

$q_i$ is the quality value associated with content item (i);

$\lambda_i$ is the scaling factor value for the resource (x); and

HV(x) is the high page value for the resource (x).

For example, the content items can be re-ranked in descending order of their respective scores that are obtained using relationship (4) to create the ranking 226.

The ranking 228 can be created, for example, based on scores obtained using relationship (5).

$$Score_i = b_i q_i - \lambda_x q_i LV(x) \quad (5)$$

where, $Score_i$ is the rank score for content item (i) from the set of ranked content items 210;

$b_i$ is the bid associated with the content item (i);

$q_i$ is the quality value associated with content item (i);

$\lambda_x$ is the scaling factor value for the resource (x); and

LV(x) is the low page value for the resource (x).

For example, the content items can be re-ranked in descending order of their respective scores that are obtained using relationship (5) to create the ranking 228.

The CISA 120 compares the ranking 226 to the ranking 228 to determine whether the ranking 226 and the ranking 228 both have the content items ranked in the same order. If the content items (i.e., from the set of ranked content items 210) are ranked in the same order in both of the ranking 226 and the ranking 228, the CISA 120 can use that ranking as the final ranking of the content items. However, for purposes of the following example, we will assume that the ranking 226 and the ranking 228 rank the content items differently (e.g., as indicated by the sign "≠").

In response to determining that the content items are ranked differently in each of the rankings 226 and 228, the CISA 120 can use an updated page value range 230 ("UPVR") to re-rank the content items. As discussed in more detail with reference to FIG. 4, the updated page value range can be determined by updating (e.g., changing) the high page value and/or the low page value. In turn, the CISA 120 can use the updated high page value and/or the updated low page value to re-rank the content items.

For purposes of example, assume that the updated page value range 230 is based on a change to the high page value 222. In this example, a new ranking of the content items can be created using relationship (4) using the updated high page value, and the new ranking can be compared to the previously created low page value ranking to determine if the content items are ranked the same in these two rankings. For example, the updated high page value can be used to create the ranking Rank_H2 232, and the CISA 120 can determine whether the ranking of the content items in the Rank_H2 232 is the same as the ranking of the content items in the Rank_L1 228. For purposes of this example, it is assumed that the rankings of the content items are the same (e.g., as indicated by the sign "="). Therefore, the CISA 120 can select the content item ranking specified by the Rank_H2 232 and the Rank_L1 228 as the selected ranking 234 (or final ranking) of the content items. The CISA 120 can then provide content item data 236 to the user device 106 specifying (e.g., based on the selected ranking 234) the content items that are to be presented in each of the presentation positions 119a and 119b.

Figure 3:
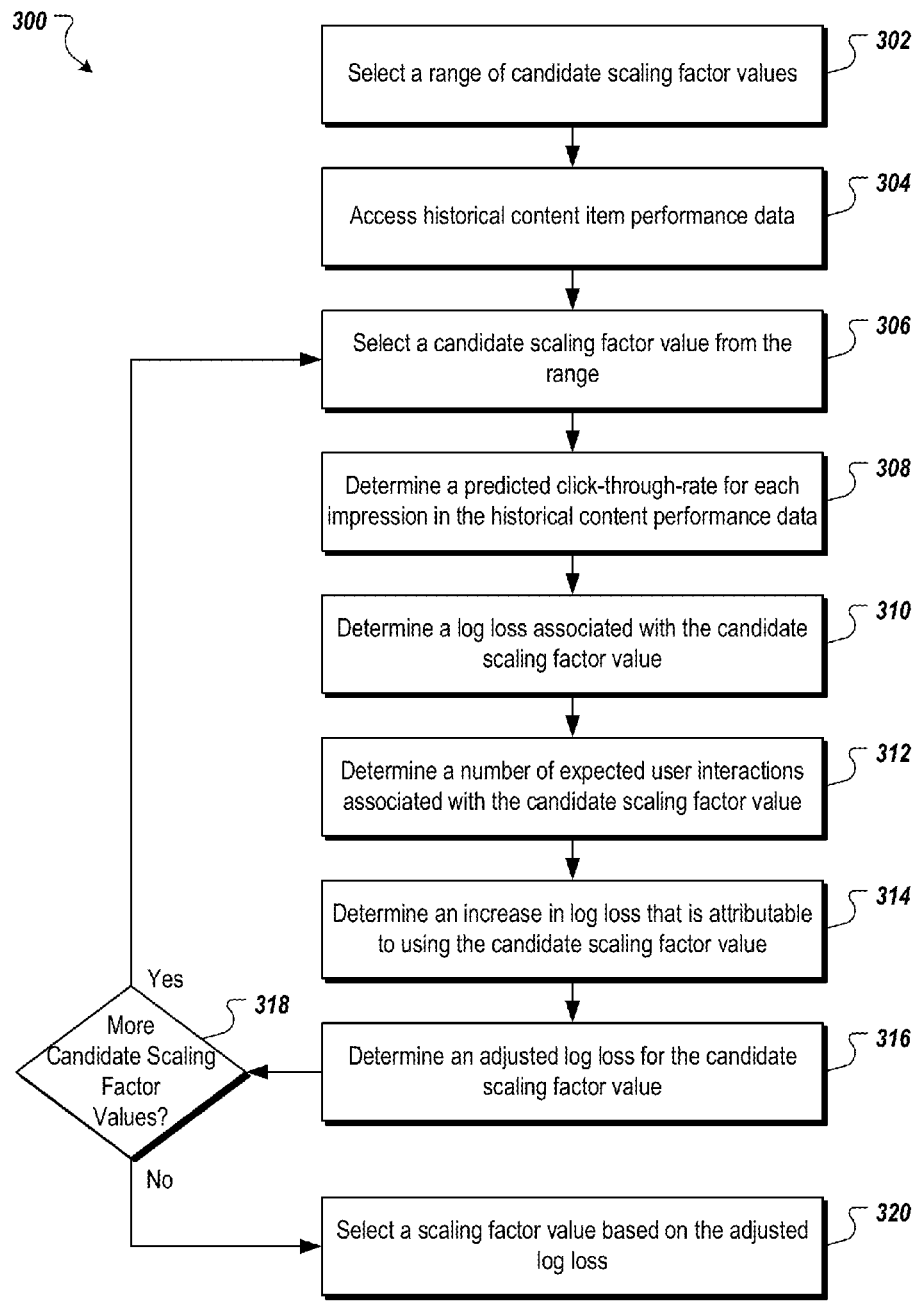
FIG. 3 is a flow chart of an example process for selecting a scaling factor value.

FIG. 3 is a flow chart of an example process 300 for selecting a scaling factor value. In some implementations, the scaling factor value is a value corresponding to the negative effect that presentation of one or more content item will have on the performance of one or more other content items that are also presented. The process 300 can be performed, for example, by one or more data processing apparatus, such as the CISA 120 and/or the content distribution system 110 of FIG. 1. Operations of the process 300 can be implemented by instructions that when executed cause one or more data processing apparatus to perform operations of the process 300. The instructions can be stored on a non-transitory computer readable medium.

A range of candidate scaling factor values is selected (302). In some implementations, the range of candidate scaling factor values can be selected by an administrator of the process 300 and/or the CISA 120. For example, an administrator of the process 300 and/or CISA 120 may select [0,4] as the range of candidate scaling factor values.

Historical content item performance data are accessed (304). In some implementations, the historical content item performance data specify impressions of content items and one or more user interactions with the content items that correspond to the impressions. For example, for each content item that received an impression, the historical performance data can include data specifying that the content item received an impression. Additionally, for each impression, the historical content item data can specify whether a user interacted with (e.g., clicked) that content item. The historical content item performance data can be stored in and/or accessed from the content item data 210 of FIG. 2.

A candidate scaling factor value is selected from the range (306). In some implementations, an initial candidate scaling factor value can be selected for evaluation by an administrator of the process 300 and/or the CISA 120. The initial candidate scaling factor value that is selected can be some fractional value (e.g., less than 1.0) in the range of candidate scaling factor values. For example, the value 0.02 (or some other value) may be selected as the initial candidate scaling factor value to be evaluated. In some implementations, subsequently selected candidate scaling factor values will be integral multiples of the initial candidate scaling factor value, as discussed in more detail below. Therefore, selecting a smaller initial scaling factor value will facilitate evaluation of more candidate scaling factor values than selection of a higher initial scaling factor value.

A predicted click-through-rate is determined for each impression in the historical content performance data (308). In some implementations, the predicted click-through-rate for each particular impression can be determined using relationship (6).

$$p_i(\lambda_c) = \frac{pf_i q_i}{1 + \lambda_c \sum_{j=1}^{s} pf_j q_j} \quad (6)$$

where, $\lambda_c$ is the candidate scaling factor value;

$p_i(\lambda_c)$ is the predicted-click-through rate for content item (i) that received the impression (i) based on the candidate scaling factor value ($\lambda_c$);

$pf_i$ is the position factor for presentation position corresponding to content item (i), e.g., the $i^{th}$ presentation position;

$q_i$ is the quality value for the content item (i);

s is a total number of presentation positions in which content items are being presented;

$pf_j$ is the position factor for the $j^{th}$ presentation position; and $q_j$ is the quality value for the content item corresponding to presentation position (j), e.g., the content item with the $j^{th}$ highest ranking.

A log loss associated with the candidate scaling factor value is determined (310). In some implementations, the log loss is determined based on the log loss that would have resulted from using the predicted click-through-rate to distributed content items corresponding to the impressions. For example, the log loss can be a sum of the log losses that are associated with each impression in the historical content item performance data. The log loss for each impression that is associated with a user interaction (e.g., each impression that is associated with historical data specifying that a user clicked the content item that received the impression) can be determined, for example, using relationship (7).

$$LL_{click} = \log(p_i(\lambda_c)) \quad (7)$$

where, $LL_{click}$ is the log loss for an impression that is associated with a user interaction; and $p_i(\lambda_c)$ is the predicted-click-through rate discussed above.

The log loss for each impression that was not clicked can be determined using relationship (8).

$$LL_{no\_click} = \log(1 - p_i(\lambda_c)) \quad (8)$$

where, $LL_{no\_click}$, is the log loss for an impression that is not associated with a user interaction; and $p_i(\lambda_c)$ is the predicted-click-through rate discussed above.

The log losses for all of the impressions can be summed to determine a total log loss that is associated with the candidate scaling factor value (e.g., ($\lambda_c$)).

A number of expected user interactions associated with the candidate scaling factor value is determined (312). In some implementations, the number of expected user interactions can be determined based on a sum of the predicted click-through-rates discussed above. For example, the predicted click-through-rates corresponding to each impression (e.g., as determined using relationship (6)) can be summed to obtain the number of expected user interactions that are associated with the candidate scaling factor value.

An increase in log loss that is attributable to using the candidate scaling factor value is determined (314). In some implementations, the increase in log loss that is attributable the candidate scaling factor value is based, at least in part, on the number of expected user interactions determined above and a number of actual user interactions that are specified by the historical performance data. For example, the increase in log loss can be determined using relationship (9).

$$\log\left(\frac{\sum_i c_i}{\sum_i p_i(\lambda_c)}\right) * \sum_i c_i - \sum_i c_i + \sum_i p_i(\lambda_c) \quad (9)$$

where, $c_i$ is a term that equals 0 if the impression (i) is not associated with a user interaction (e.g., a click), and equals 1 if the impression (i) is associated with a user interaction.

In relationship (9) $\Sigma_i c_i$ represents the actual number of user interactions that are associated with the impressions in the historical performance data and $\Sigma_i p_i(\lambda_c)$ represents the expected number of user interactions based on the predicted click-through-rates that were computed using the candidate scaling factor value, as discussed above.

An adjusted log loss is determined for the candidate scaling factor value (316). In some implementations, the adjusted log loss for a particular candidate scaling factor value is determined based on a difference between the total log loss and the increase in log loss. For example, a mathematical difference between the total log loss and the increase in log loss can be determined by subtracting the increase in log loss computed using relationship (9) from the sum of the log losses computed using relationships (7) and (8).

A determination is made whether more candidate scaling factor values will be evaluated (318). In some implementations, the determination is made based on the candidate scaling factor value that was most recently evaluated and the range of candidate scaling factor values. For example, each candidate scaling factor value that is evaluated can be an integral multiple of the initial scaling factor value that is evaluated. In this example, each integral multiple of the initial scaling factor value can be evaluated until a next integral multiple is outside of the range of candidate scaling factor values. Therefore, the determination of whether more candidate scaling factor values will be evaluated can be based on whether a next integral multiple of the initial scaling factor value is within the range of candidate scaling factor values.

When it is determined that more candidate scaling factor values will be evaluated, an additional candidate scaling factor value is selected from the range of candidate scaling factor values (306). In turn, the actions discussed with reference to reference numbers 308, 310, 312, 314, and 316 can be performed based on the additional scaling factor value. In some implementations, at least two different candidate scaling factor values are evaluated.

When it is determined that more candidate scaling factor values will not be evaluated, a scaling factor value is selected (e.g., from the candidate scaling factor values) based on the adjusted log loss of each candidate scaling factor value. In some implementations, the scaling factor value can be the candidate scaling factor value having an adjusted log loss that is less than some specified adjusted log loss. For example, the candidate scaling factor value having the lowest adjusted log loss (e.g., among all candidate scaling factor values in the range) can be selected as the scaling factor value that will be used.

Figure 4:
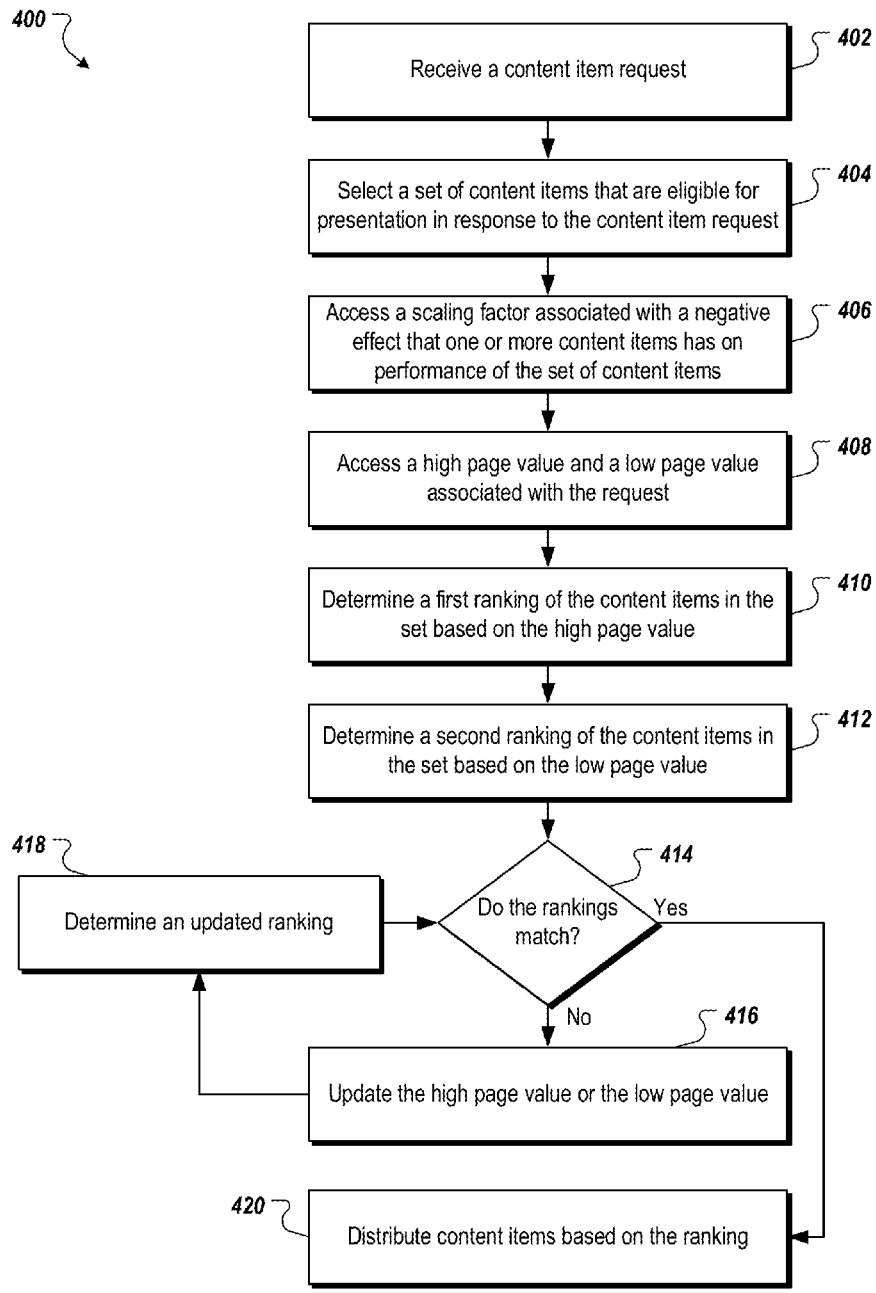
FIG. 4 is a flow chart of an example process for selecting a presentation order for a set of content items.

FIG. 4 is a flow chart of an example process 400 for selecting a presentation order for a set of content items. The process 400 can be performed, for example, by one or more data processing apparatus, such as the CISA 120 and/or the content distribution system 110 of FIG. 1. Operations of the process 400 can be implemented by instructions that when executed cause one or more data processing apparatus to perform operations of the process 400. The instructions can be stored on a non-transitory computer readable medium.

A content item request is received (402). In some implementations, the content item request is a request for content items to be presented in at least some of two or more presentation positions of a resource. As discussed above with reference to FIG. 1, a content item can include multiple presentation positions. The content item request can include information specifying the number of presentation positions, which can correspond to a maximum number of content items that can be presented in a single page view and/or provided in response to the request.

A set of content items that are eligible for presentation in response to the content item request is selected (404). As discussed above with respect to FIG. 1, the set of content items that are eligible or presentation in response to the request can be selected based, at least in part, on distribution parameters (e.g., distribution keywords) of the content items that are matched by information (e.g., a search query or resource keyword) included in (or associated with) the request.

The set of eligible content items can also be selected, at least in part based on bids associated with the content items. As discussed above with respect to FIG. 2, the content items can be initially ranked based, at least in part, on the bids that are associated with the content items. For example, the content items can be ranked in descending order based on an estimated value of each content item (e.g., as determined using relationship (1)). In turn, a highest ranking set of the content items can be selected as the content items that will be distributed for presentation in response to the content item request.

A scaling factor value is accessed (406). In some implementations, the scaling factor value is associated with a negative effect that presentation of one or more content items has on performance of one or more other content items. For example, as discussed above, as more content items are presented on a same page, the likelihood that user interacts with each individual content item is generally lower than it would have been if fewer content items were presented.

In some implementations, the scaling factor value can be accessed from a data store storing scaling factor values for resources. For example, as discussed above with respect to FIG. 2, each scaling factor value can be indexed according to the resource for which the scaling factor value was determined. Therefore, upon receipt of the request, information identifying the resource with which the content items will be presented can be used to identify and/or access the scaling factor value that will be used for the request.

A high page value and a low page value associated with the request are accessed (408). In some implementations, the high page value and the low page value can be accessed by accessing a page value range that specifies at least the high page value and the low page value. As discussed above, the high page value and the low page value can be values that are respectively higher and lower than the expected page value for the resource corresponding to the request. In some implementations, the high page value and the low page value for each resource can be pre-specified and/or accessed from a data store that stores high page values and low page values for resources.

In some implementations, the high page value and the low page value are determined after receiving the request. For example, as discussed above with respect to FIG. 2, the high page value can be determined based, at least in part, on bids associated with the content items in the set of eligible content items, historical performance measures corresponding to the content items in the set of eligible content items, and position factors for presentation positions corresponding to the content items. For example, relationship (2) can be used to determine the high page value.

In some implementations, the high page value is determined based on a sum of expected values for the content items in the set of eligible content items. For example, each of the content items in the set of eligible content items can be ranked based on a product of the bid associated with the content item and a quality value corresponding to a historical performance of the content item. Based on the ranking, a highest ranking set of the content items (e.g., a set including enough content items to fill the available presentation positions) is identified. For each content item in the highest ranking set, an expected value of the content item is determined based on a product of the bid associated with the content item, the quality value for the content item, and a presentation position corresponding to the content item. In turn, the expected values of the content items can be summed to obtain the high page value.

As discussed above with respect to FIG. 2, the low page value can be determined based, at least in part, on the bids associated with the content items in the set of eligible content items, historical performance measures of the content items, and the scaling factor value. For example, relationship (3) can be used to determine the low page value.

In some implementations, the low page value is determined based, at least in part on a ratio of the high page value relative to a discount value. The discount value is determined, based, at least in part on the scaling factor value the quality values for the content items in the highest ranking set, and position factors for presentation positions corresponding to the content items in the highest ranking set (e.g., the presentation positions in which the content items would be presented based on the ranking). As illustrated by relationship (3), the discount value can be represented by the expression $1+\lambda_x \sum_{m=1}^{s} pf_m q_m$, the terms of which are described above with reference to FIG. 2.

A first ranking of the content items in the set is determined based on the high page value (410). In some implementations, the first ranking is determined by re-ranking the set of highest ranking content items based on scores computed using the high page value. For example, the scores for each content item in the set of highest ranking content items can be determined using relationship (4), which is discussed above with respect to FIG. 2.

A second ranking of the content items in the set is determined based on the low page value (412). In some implementations, the second ranking is determined by re-ranking the set of highest ranking content items based on scores computed using the low page value. For example, the scores for each content item in the set of highest ranking content items can be determined using relationship (5), which is discussed above with respect to FIG. 2.

A determination is made whether the first ranking and the second ranking match (414). In some implementations, the determination can be made by comparing the order of content items in the first ranking to the order of content items in the second ranking. If the order of the content items is the same in each of the first and second rankings, then the first ranking and the second ranking are considered to match. If the order of content items is not the same in each of the first and second rankings, then the first and second rankings are not considered to match.

In response to determining that the first ranking and the second ranking do not match, one of the high page value or the low page value is updated (416). In some implementations, only one of the high page value or low page value is updated in response to determining that the first and second rankings do not match. The value to which either the high page value or low page value is set can be an average value of the sum of the current high page value and the current low page value. For example, the value to which the high page value or low page value is set can be represented by relationship (10).

$$PV' = \frac{1}{2} * (HV(x) + LV(x)) \qquad (10)$$

where,
PV' is the updated page value;
HV(x) is the current high page value for resource (x); and
LV(x) is the current low page value for resource (x).

When the first ranking and the second ranking do not match, the content items in the highest ranking set can be re-ranked in descending scores that are determined based on relationship (11).

$$\text{Score}_i = b_i q_i PV' \qquad (11)$$

where,
$\text{Score}_i$ is the score for content item (i);
$b_i$ is the bid associated with content item (i)
$q_i$ is the quality value associated with content item (i);
$\lambda_x$ is the scaling factor value for resource (x); and
PV' is the updated page value from relationship (10).

In some implementations, the determination as to which of the current high page value or current low page value is updated to the value resulting from relationship (10) can be based on a comparison between PV' and the value that results from relationship (12).

$$\phi(PV') = \sum_{m=1}^{s} pf_m (b_m q_m - \lambda_x q_m PV') \qquad (12)$$

where,
$\phi(PV')$ is the comparison value;
$b_m$ is the bid associated with the $m^{th}$ highest ranked content item when the content items are ranked based on the scores obtained using relationship (11);
$q_m$ is the quality value for the $m^{th}$ highest ranked content item;
$pf_m$ is the position factor for the $m^{th}$ presentation position (e.g., the presentation position in which the $m^{th}$ highest ranked content item would be presented according to the ranking based on the scores obtained using relationship (11));
$\lambda_x$ is the scaling factor value for resource (x); and
PV' is the updated page value from relationship (10).

The comparison value ($\phi(PV')$ resulting from relationship (12) is compared to the updated page value PV'. If the comparison value is less than the updated page value, then the high page value is set to the updated page value (e.g., HV is set to PV'). If the comparison value is not less than the updated page value, then the low page value is set to the updated page value. Once at least one of the high page value or the low page value is updated (or otherwise adjusted), the page range value is considered to be an updated page value range (e.g., that differs from the previous page value range).

An updated ranking is determined based on the updated high page value or updated low page value (418). In some implementations, the updated ranking can be determined by re-ranking the content items in the highest ranking set based, at least in part, on the page value that was updated. For example, assume that the high page value is set to the updated page value in the manner discussed above. In this example, the updated ranking can be determined using relationship (13).

$$Score_i = b_i q_i - \lambda_x q_i HV' \quad (13)$$

where,

Score$_i$ is the rank score for content item (i);

b$_i$ is the bid associated with the content item (i);

q$_i$ is the quality value associated with content item (i);

$\lambda_x$ is the scaling factor value for the resource (x); and

HV' is the updated high page value for the resource (x) (e.g., the value of PV' discussed above).

This updated ranking for the high page value can then be compared to the ranking that was determined using the low page value to determine whether the rankings match (414). If the rankings do not match, then one of the high page value (e.g., which was previously set to the value of PV') or the low page value can be updated in the manner discussed above. In some implementations, the updates to the high page value or low page value, updates to the rankings, and the comparisons of the rankings can iteratively continue until the rankings match.

In response to determining that the rankings match, content items are distributed based on the ranking (420). For example, as discussed above with reference to FIG. 2, the content items can be distributed to the user device with information specifying which presentation position to which each of the content items has been assigned.

Figure 5:
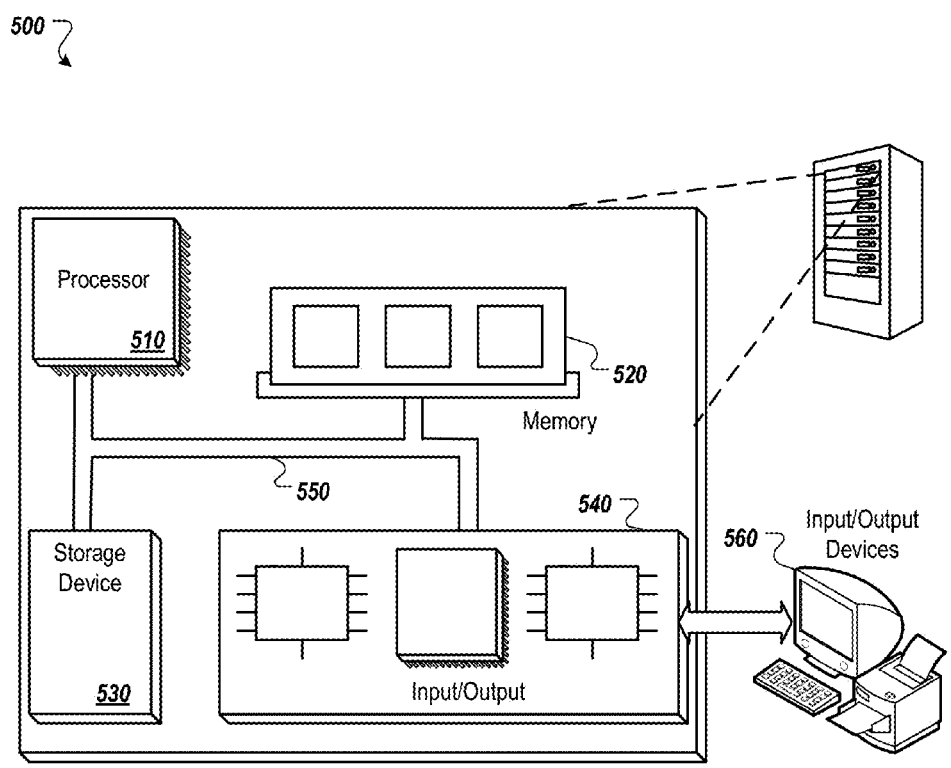
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, comprising:
receiving, by one or more processors, a request for third-party content, the request including an indication of a resource where the third-party content is to be presented;
selecting, by the one or more processors, a plurality of content items eligible for presentation at a plurality of presentation positions of the resource responsive to the request, each presentation position associated with a corresponding position factor indicative of the likelihood of interaction with a content item presented in that presentation position;
accessing, by the one or more processors, from a memory, a scaling factor value representing a reduction in the likelihood of interaction with the plurality of content items when presented together on the resource, the scaling factor value specific to the resource;
determining, by the one or more processors, a first page value range specifying at least a high page value and a low page value, the high page value exceeding an expected cumulative performance of the plurality of content items computed using historical data associated with each of the plurality of content items and the position factors of the plurality of presentation positions, and the low page value is less than the expected cumulative performance of the plurality of content items and is determined using the high page value and the scaling factor value;
determining, by the one or more processors, a first ranking of the plurality of content items based on the high page value and the scaling factor value, the first ranking of the plurality of content items indicative of a first placement of the plurality of content items into the plurality of presentation positions;
determining, by the one or more processors, a second ranking of the plurality of content items based on the low page value and the scaling factor value, the second ranking of the plurality of content items indicative of a second placement of the plurality of content items into the plurality of presentation positions;
determining, by the one or more processors, that the first ranking of the plurality of content items does not match the second ranking of the plurality of content items;
in response to determining that the first ranking does not match the second ranking, determining, by the one or more processors, a second page value range that differs from the first page value range by updating at least one of the high page value and the low page value;
determining, by the one or more processors, an updated first ranking of the plurality of content items and an updated second ranking of the plurality of content items based on the second page value range;
determining, by the one or more processors, that the updated first ranking matches the updated second ranking; and
in response to determining that the updated first ranking matches the updated second ranking, distributing, by the one or more processors, the plurality of content items for display in the plurality of presentation positions based on the updated first ranking.

2. The method of claim 1, further comprising:
selecting, by the one or more processors, a range of scaling factor values;
accessing, by the one or more processors, from the memory, historical content item performance data specifying impressions of the plurality of content items and one or more actual user interactions with the plurality of content items that correspond to the impressions; and
selecting, by the one or more processors, the scaling factor value based, at least in part, on the historical content item performance data accessed from the memory.

3. The method of claim 2, wherein selecting the scaling factor value comprises:
for each of two or more particular scaling factor values in the range of scaling factor values:
determining, by the one or more processors, based on the particular scaling factor value and the historical content item performance data, a predicted click-through-rate for each of the impressions;
determining, by the one or more processors, a log loss that would have resulted from using the predicted click-through-rate to distribute content items corresponding to the impressions;
determining, by the one or more processors, a number of expected user interactions with content items that would have occurred in response to using the particular scaling factor value;
determining, by the one or more processors, based at least in part on the number of expected user interactions and a number of the actual user interactions, an increase in log loss that is attributable to using the particular scaling factor value for content item distribution; and
determining, by the one or more processors, based on a difference between the log loss and the increase in log loss, an adjusted log loss for the particular scaling factor value; and
selecting, by the one or more processors, the particular scaling factor value having less than a specified adjusted log loss.

4. The method of claim 3, wherein selecting the particular scaling factor value having less than a specified adjusted log loss comprises selecting the particular scaling factor value having a lowest adjusted log loss.

5. The method of claim 1, further comprising:
determining the high page value based, at least in part, on bids associated with the plurality of content items, historical performance measures corresponding to the plurality of content items, and the position factors for the plurality of presentation positions.

6. The method of claim 5, wherein determining the high page value comprises:
ranking each of at least some of the plurality of content items based on a product of the bid associated with the content item and a quality value corresponding to a historical performance measure for the content item;
identifying, based on the ranking, a highest ranking set of the content items;
determining, for each content item in the highest ranking set, an expected value of the content item based on a product of the bid associated with the content item, the quality value for the content item, and a position factor for a presentation position corresponding to the content item; and
summing the first expected values for the content items in the highest ranking set to obtain the high page value.

7. The method of claim 6, further comprising:
determining a discount value based, at least in part, on the scaling factor value, the quality values for the content items in the highest ranking set, and position factors for presentation positions corresponding to the highest ranking set, wherein determining the low page value comprises determining the low page value based, at least in part, on a ratio of the high page value relative to the discount value.

8. A non-transitory computer storage medium encoded with a computer program, the program comprising instructions that when executed by one or more data processing apparatus cause the one or more data processing apparatus to perform operations comprising:

receiving a request for third-party content, the request including an indication of a resource where the third-party content is to presented;

selecting a plurality of content items eligible for presentation at a plurality of presentation positions of the resource responsive to the request, each presentation position associated with a corresponding position factor indicative of the likelihood of interaction with a content item presented in that presentation position;

accessing, from a memory, a scaling factor value representing a reduction in the likelihood of interaction with the plurality of content items when presented together on the resource, the scaling factor value specific to the resource;

determining a first page value range specifying at least a high page value and a low page value, the high page value exceeding an expected cumulative performance of the plurality of content items computed using historical data associated with each of the plurality of content items and the position factors of the plurality of presentation positions, and the low page value is less than the expected cumulative performance of the plurality of content items and is determined using the high page value and the scaling factor value;

determining a first ranking of the plurality of content items based on the high page value and the scaling factor value, the first ranking of the plurality of content items indicative of a first placement of the plurality of content items into the plurality of presentation positions;

determining a second ranking of the plurality of content items based on the low page value and the scaling factor value, the second ranking of the plurality of content items indicative of a second placement of the plurality of content items into the plurality of presentation positions;

determining that the first ranking of the plurality of content items does not match the second ranking of the plurality of content items;

in response to determining that the first ranking does not match the second ranking, determining a second page value range that differs from the first page value range by updating at least one of the high page value and the low page value;

determining an updated first ranking of the plurality of content items and an updated second ranking of the plurality of content items based on the second page value range;

determining, that the updated first ranking matches the updated second ranking; and in response to determining that the updated first ranking matches the updated second ranking, distributing the plurality of content items for display in the plurality of presentation positions based on the updated first ranking.

9. The computer storage medium of claim 8, wherein the instruction cause the one or more data processing apparatus to perform operations further comprising:

selecting a range of scaling factor values;

accessing, from the memory, historical content item performance data specifying impressions of the plurality of content items and one or more actual user interactions with the plurality of content items that correspond to the impressions; and selecting the scaling factor value based, at least in part, on the historical content item performance data accessed from the memory.

10. The computer storage medium of claim 9, wherein selecting the scaling factor value comprises:

for each of two or more particular scaling factor values in the range of scaling factor values:
determining, based on the particular scaling factor value and the historical content item performance data, a predicted click-through-rate for each of the impressions;
determining a log loss that would have resulted from using the predicted click-through-rate to distribute content items corresponding to the impressions;
determining a number of expected user interactions with content items that would have occurred in response to using the particular scaling factor value;
determining, based at least in part on the number of expected user interactions and a number of the actual user interactions, an increase in log loss that is attributable to using the particular scaling factor value for content item distribution; and
determining, based on a difference between the log loss and the increase in log loss, an adjusted log loss for the particular scaling factor value; and selecting the particular scaling factor value having less than a specified adjusted log loss.

11. The computer storage medium of claim 10, wherein selecting the particular scaling factor value having less than a specified adjusted log loss comprises selecting the particular scaling factor value having a lowest adjusted log loss.

12. The computer storage medium of claim 8, wherein the instruction cause the one or more data processing apparatus to perform operations further comprising:

determining the high page value based, at least in part, on bids associated with the plurality of content items, historical performance measures corresponding to the plurality of content items, and the position factors for the plurality of presentation positions.

13. The computer storage medium of claim 12, wherein determining the high page value comprises:

ranking each of at least some of the plurality of content items based on a product of the bid associated with the content item and a quality value corresponding to a historical performance measure for the content item;

identifying, based on the ranking, a highest ranking set of the content items;

determining, for each content item in the highest ranking set, an expected value of the content item based on a product of the bid associated with the content item, the quality value for the content item, and a position factor for a presentation position corresponding to the content item; and summing the first expected values for the content items in the highest ranking set to obtain the high page value.

14. The computer storage medium of claim 13, wherein the instruction cause the one or more data processing apparatus to perform operations further comprising:

determining a discount value based, at least in part, on the scaling factor value, the quality values for the content items in the highest ranking set, and position factors for presentation positions corresponding to the highest ranking set, wherein determining the low page value comprises determining the low page value based, at least in part, on a ratio of the high page value relative to the discount value.

15. A system comprising:
a data store; and
one or more data processing apparatus that interact with the data store and execute instructions to perform operations comprising:
receiving a request for third-party content, the request including an indication of a resource where the third-party content is to be presented;
selecting a plurality of content items eligible for presentation at a plurality of presentation positions of the resource responsive to the request, each presentation position associated with a corresponding position factor indicative of the likelihood of interaction with a content item presented in that presentation position;
accessing, from the data store, a scaling factor value representing a reduction in the likelihood of interaction with the plurality of content items when presented together on the resource, the scaling factor value specific to the resource;
determining a first page value range specifying at least a high page value and a low page value, the high page value exceeding an expected cumulative performance of the plurality of content items computed using historical data associated with each of the plurality of content items and the position factors of the plurality of presentation positions, and the low page value is less than the expected cumulative performance of the plurality of content items and is determined using the high page value and the scaling factor value;
determining a first ranking of the plurality of content items based on the high page value and the scaling factor value, the first ranking of the plurality of content items indicative of a first placement of the plurality of content items into the plurality of presentation positions;
determining a second ranking of the plurality of content items based on the low page value and the scaling factor value, the second ranking of the plurality of content items indicative of a second placement of the plurality of content items into the plurality of presentation positions;
determining that the first ranking of the plurality of content items does not match the second ranking of the plurality of content items;
in response to determining that the first ranking does not match the second ranking, determining a second page value range that differs from the first page value range by updating at least one of the high page value and the low page value;
determining an updated first ranking of the plurality of content items and an updated second ranking of the plurality of content items based on the second page value range;
determining, that the updated first ranking matches the updated second ranking; and
in response to determining that the updated first ranking matches the updated second ranking, distributing the plurality of content items for display in the plurality of presentation positions based on the updated first ranking.

16. The system of claim 15, wherein the instructions cause the one or more data processing apparatus to perform operations further comprising:
selecting a range of scaling factor values;
accessing historical content item performance data specifying impressions of content items and one or more actual user interactions with the content items that correspond to the impressions; and
accessing, from the data store, historical content item performance data specifying impressions of the plurality of content items and one or more actual user interactions with the plurality of content items that correspond to the impressions; and
selecting the scaling factor value based, at least in part, on the historical content item performance data accessed from the memory.

17. The system of claim 16, wherein selecting the scaling factor value comprises:
for each of two or more particular scaling factor values in the range of scaling factor values:
determining, based on the particular scaling factor value and the historical content item performance data, a predicted click-through-rate for each of the impressions;
determining a log loss that would have resulted from using the predicted click-through-rate to distribute content items corresponding to the impressions;
determining a number of expected user interactions with content items that would have occurred in response to using the particular scaling factor value;
determining, based at least in part on the number of expected user interactions and a number of the actual user interactions, an increase in log loss that is attributable to using the particular scaling factor value for content item distribution; and
determining, based on a difference between the log loss and the increase in log loss, an adjusted log loss for the particular scaling factor value; and
selecting the particular scaling factor value having less than a specified adjusted log loss.

18. The system of claim 17, wherein selecting the particular scaling factor value having less than a specified adjusted log loss comprises selecting the particular scaling factor value having a lowest adjusted log loss.

19. The system of claim 15, wherein the instructions cause the one or more data processing apparatus to perform operations further comprising:
determining the high page value based, at least in part, on bids associated with the plurality of content items, historical performance measures corresponding to the plurality of content items, and the position factors for the plurality of presentation positions.

20. The system of claim 19, wherein:
determining the high page value comprises:
ranking each of at least some of the plurality of content items based on a product of the bid associated with the content item and a quality value corresponding to a historical performance measure for the content item;
identifying, based on the ranking, a highest ranking set of the content items;
determining, for each content item in the highest ranking set, an expected value of the content item based on a product of the bid associated with the content item, the quality value for the content item, and a position factor for a presentation position corresponding to the content item; and summing the first expected values for the content items in the highest ranking set to obtain the high page value;

the instructions cause the one or more data processing apparatus to perform operations further comprising determining a discount value based, at least in part, on the scaling factor value, the quality values for the content items in the highest ranking set, and position factors for presentation positions corresponding to the highest ranking set; and determining the low page value comprises determining the low page value based, at least in part, on a ratio of the high page value relative to the discount value.

* * * * *